(12) United States Patent
Murakami (10) Patent No.: US 8,525,854 B2
(45) Date of Patent: Sep. 3, 2013

(54) DISPLAY DEVICE AND SCREEN DISPLAY METHOD

(75) Inventor: Keiichi Murakami, Ichikawa (JP)

(73) Assignee: NTT DoCoMo, Inc., Tokyo (JP)

( * ) Notice: Subject to any disclaimer, the term of this patent is extended or adjusted under 35 U.S.C. 154(b) by 188 days.

(21) Appl. No.: 13/039,980

(22) Filed: Mar. 3, 2011

(65) Prior Publication Data

US 2011/0216094 A1 Sep. 8, 2011

(30) Foreign Application Priority Data

Mar. 8, 2010 (JP) ............... P2010-050678

(51) Int. Cl.
*G09G 5/00* (2006.01)

(52) U.S. Cl.
USPC ........................................................ 345/660

(58) Field of Classification Search
USPC ........................................................ 345/661
See application file for complete search history.

(56) References Cited

U.S. PATENT DOCUMENTS

| | | | | |
|---|---|---|---|---|
| 7,456,849 B2 * | 11/2008 | Brooke | | 345/661 |
| 7,728,821 B2 * | 6/2010 | Hillis et al. | | 345/173 |
| 8,217,907 B2 * | 7/2012 | Kim et al. | | 345/173 |
| 2006/0232611 A1 | 10/2006 | Brooke | | |
| 2007/0188473 A1 * | 8/2007 | Anwar | | 345/173 |
| 2008/0001927 A1 * | 1/2008 | Yoshida | | 345/173 |
| 2008/0165161 A1 | 7/2008 | Platzer et al. | | |
| 2009/0085936 A1 * | 4/2009 | Chen et al. | | 345/661 |
| 2009/0237421 A1 * | 9/2009 | Kim et al. | | 345/661 |
| 2010/0056221 A1 | 3/2010 | Park | | |
| 2010/0079501 A1 * | 4/2010 | Ikeda et al. | | 345/661 |
| 2010/0141684 A1 * | 6/2010 | Machida | | 345/661 |
| 2010/0164904 A1 * | 7/2010 | Kim et al. | | 345/174 |
| 2010/0315438 A1 * | 12/2010 | Horodezky et al. | | 345/661 |
| 2011/0141120 A1 | 6/2011 | Platzer et al. | | |
| 2011/0173575 A1 * | 7/2011 | Karafiat | | 715/863 |
| 2012/0188164 A1 * | 7/2012 | Dey et al. | | 345/163 |
| 2012/0223971 A1 * | 9/2012 | Hillis | | 345/649 |

FOREIGN PATENT DOCUMENTS

| | | |
|---|---|---|
| CN | 101097495 A | 1/2008 |
| EP | 2 042 976 A1 | 4/2009 |
| JP | 6-187089 | 7/1994 |
| JP | 2002-328040 | 11/2002 |

(Continued)

OTHER PUBLICATIONS

Olwal, A., Feiner, S., and Heyman, S.; Rubbing and Tapping for Precise and Rapid Selection on Touch-Screen Displays; Apr. 5-10, 2010; Florence, Italy; Proceedings of CHI 2008 (SIGCHI Conference on Human Factors in Computing Systems); pp. 295-304.*

(Continued)

*Primary Examiner* — Kee M Tung
*Assistant Examiner* — Richard M Russell
(74) *Attorney, Agent, or Firm* — Oblon, Spivak, McClelland, Maier & Neustadt, L.L.P.

(57) ABSTRACT

It is intended to enable enlarging or reducing a screen with a simple operation. A mobile phone 1 includes a touch panel 11 that displays a screen and receives a predetermined input, a detection unit 12 that detects a start point and an end point of a physical touch on the touch panel 11, and a display control unit 13 that calculates a moving direction of the touch on the basis of the detection result, enlarges the screen displayed on the touch panel 11 when the moving direction is in a predetermined first range, and reduces the screen when the moving direction is in a predetermined second range different from the first range.

9 Claims, 9 Drawing Sheets

(56) References Cited

FOREIGN PATENT DOCUMENTS

| JP | 2003-248542 A | 9/2003 |
|----|---------------|--------|
| JP | 2007-11797    | 1/2007 |
| JP | 2007-130367   | 5/2007 |
| JP | 2009-187057   | 8/2009 |
| JP | 2009-223426   | 10/2009 |

OTHER PUBLICATIONS

Katherine Everitt, Chia Shen, Kathy Ryall, and Clifton Forlines; Modal spaces: Spatial Multiplexing to Mediate Direct-Touch Input on Large Displays; Extended Abstracts on Human Factors in Computing Systems (CHI EA 2005); ACM, New York, NY, USA, 1359-1362.*

Extended European Search Report issued Feb. 23, 2012 in patent application No. 11157161.8.

Office Action issued Sep. 18, 2012, in Japanese Patent Application No. 2010-050678 with English translation.

Japanese Office Action issued Jan. 31, 2012, in Patent Application No. 2010-050678 (with English-language translation).

Chinese First Notification of Office Action issued Apr. 2, 2013 in Chinese Application No. 201110055937.5 with English translation, 18 pages.

* cited by examiner

DISPLAY DEVICE AND SCREEN DISPLAY METHOD

BACKGROUND OF THE INVENTION

1. Field of the Invention

The present invention relates to a display device and a screen display method thereof.

2. Related Background Art

Various display devices have been known. For example, Japanese Unexamined Patent Application Publication No. 2009-223426 discloses an information display device that performs a display process such as enlargement and reduction on the basis of a control signal generated by a combination of inputs from a pair of touch panels.

SUMMARY OF THE INVENTION

However, in the device described in Japanese Unexamined Patent Application Publication No. 2009-223426, it is necessary to operate two touch panels to enlarge or reduce a screen and thus it cannot be said that the interface is convenient for a user.

Therefore, an object of the invention is to provide a display device and a screen display method which can enlarge or reduce a screen with a simple operation.

According to an aspect of the invention, there is provided a display device comprising: a touch panel that displays a screen and receives a predetermined input; detection means for detecting a start point and an end point of a physical touch on the touch panel; and display control means for calculating the moving direction of the touch on the basis of the detection result from the detection means, enlarging the screen displayed on the touch panel when the moving direction is in a predetermined first range, and reducing the screen when the moving direction is in a predetermined second range different from the first range.

According to another aspect of the invention, there is provided a screen display method executed by a display device including a touch panel that displays a screen and receives a predetermined input, the screen display method comprising: a detection step of detecting a start point and an end point of a physical touch on the touch panel; and a display control step of calculating the moving direction of the touch on the basis of the detection result in the detection step, enlarging the screen displayed on the touch panel when the moving direction is in a predetermined first range, and reducing the screen when the moving direction is in a predetermined second range different from the first range.

According to this configuration, the moving direction of the touch on the touch panel is calculated and a screen is enlarged or reduced and displayed depending on whether the moving direction is in a predetermined range. Accordingly, a user can enlarge or reduce a screen by simply touching a point on the touch panel with a finger or a pointing device and moving the finger or the pointing device in a predetermined direction. That is, the user can enlarge or reduce a screen with a simple operation.

In the display device, the first range may be a section obtained by dividing the surrounding area of the start point into three or more sections and the second range may be a section different from the section obtained.

In this case, the screen is enlarged or reduced only when the touch operation and the moving operation are performed within predetermined ranges (sections) of the touch panel. Accordingly, it is possible to provide a display device which is convenient to use by properly setting the ranges (sections) in accordance with the intuitive operation of a user.

In the display device, the first range may be a section obtained by dividing the surrounding area of the start point into eight sections and the second range may be a section different from the section obtained, each of the section and the other section may extend in an oblique direction from the start point in the screen, and at least a part of the other section may be opposed to the section obtained.

In this case, the screen is enlarged or reduced only when the touch operation and the moving operation are performed within the ranges (sections) opposed to each other in the oblique direction with respect to the start point of the touch. This is intended to allow a user to intuitively perform an enlargement and reduction operation by determining the Z axis (axis perpendicular to the touch panel) in a three-dimensional coordinate system obliquely projected on to a two-dimensional screen as a direction of enlargement or reduction. Accordingly, it is possible to provide a display device which is convenient to use by setting the ranges (sections) in this way.

In the display device, the display control means may scroll the screen in the moving direction when the moving direction is out of the first and second ranges.

In this case, it is possible to provide a user with an interface that enlarges or reduces a screen when dragging the touch panel in a specific direction and that scrolls the screen when dragging the touch panel in the other directions.

In the display device, the display control means may calculate the moving speed of the touch on the basis of the detection result from the detection means, enlarge the screen displayed on the touch panel when the moving speed is equal to or greater than a predetermined threshold value and the moving direction is in the first range, and reduce the screen when the moving speed is equal to or greater than the predetermined threshold value and the moving direction is in the second range.

In this case, the screen is first enlarged or reduced when the operation of dragging the touch panel is performed in the first or second range at a speed equal to or greater than a predetermined speed. Accordingly, it is possible to separately set a process when the dragging operation is performed in the range at a speed less than the predetermined speed.

In the display device, the display control means may scroll the screen in the moving direction when the moving speed is less than the predetermined threshold value.

In this case, it is possible to provide a user with an interface that enlarges or reduces a screen when dragging the touch panel in a specific direction at a specific speed and that scrolls the screen in the direction regardless of whether the dragging direction on the screen is within the first or second range when dragging the touch panel at a speed less than the specific speed.

According to the display device and the screen display method, since a screen is enlarged or reduced and displayed depending on the moving direction of a touch on the touch panel, a user can enlarge or reduce a screen with a simple operation.

DESCRIPTION OF THE PREFERRED EMBODIMENTS

Hereinafter, embodiments of the invention will be described in detail with reference to the accompanying drawings. In the embodiments, a display device according to the invention is applied to a mobile phone. In explaining the drawings, the same or equivalent elements are referenced by the same reference numerals and the description thereof is not repeated.

First Embodiment

Figure 1:
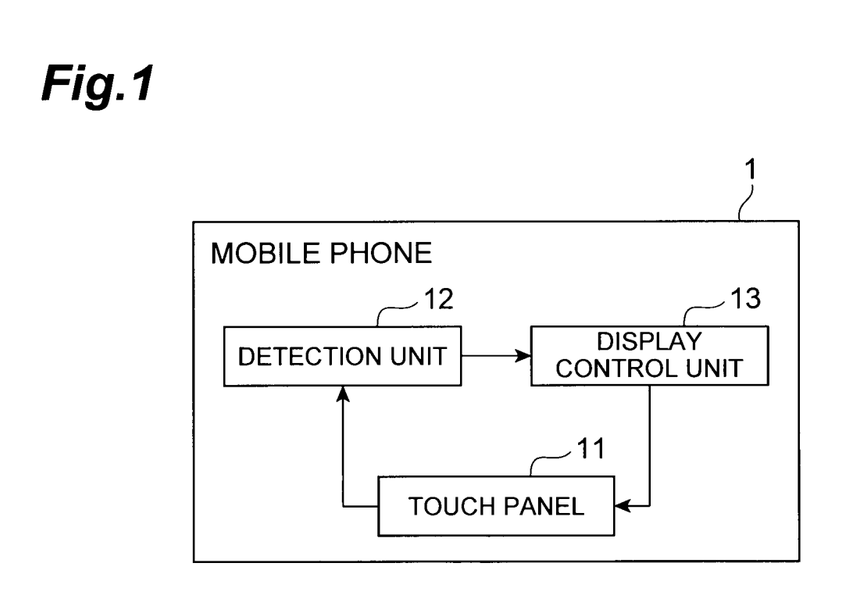
FIG. 1 is a block diagram illustrating the functional configuration of a mobile phone according to a first embodiment of the invention.

First, the functions and configuration of a mobile phone 1 according to a first embodiment of the invention will be described with reference to FIGS. 1 to 4. The mobile phone 1 is a communication terminal having a calling function, an e-mail function, and a web browser function. As shown in FIG. 1, the mobile phone 1 includes a touch panel 11, a detection unit 12, and a display control unit 13 as the functional elements.

Figure 2:
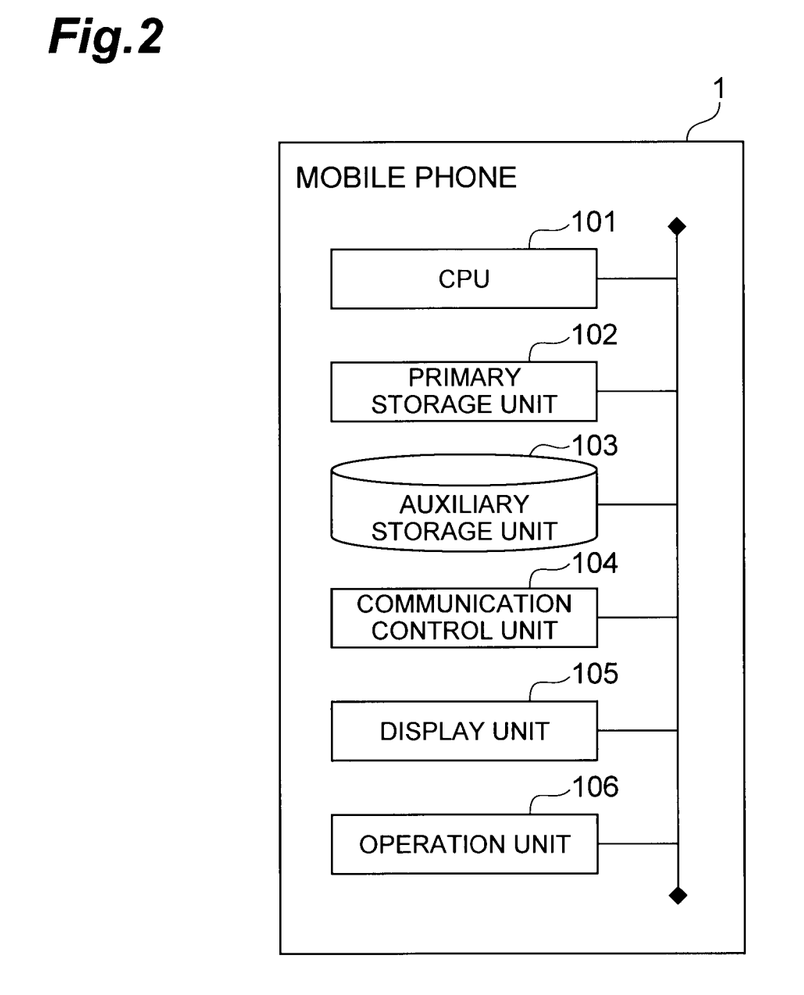
FIG. 2 is a diagram illustrating the hardware configuration of the mobile phone shown in FIG. 1.

As shown in FIG. 2, the mobile phone 1 includes a CPU 101 executing an operating system and applications or programs, a primary storage unit 102 including a ROM and a RAM, an auxiliary storage unit 103 including a memory and the like, a communication control unit 104 performing data communication, a display unit 105 including a touch panel type monitor and the like, and an operation unit 106 including input keys and the like. The functions shown in FIG. 1 are performed by reading a predetermined program onto the CPU 101 and the primary storage unit 102, activating the communication control unit 104, the display unit 105, and the operation unit 106 under the control of the CPU 101, and causing them to read or write data from and to the primary storage unit 102 or the auxiliary storage unit 103. A database or data necessary for the processes is stored in the primary storage unit 102 or the auxiliary storage unit 103.

Referring to FIG. 1 again, the touch panel 11 is a means for displaying data and receiving an input based on a touch with a user's finger or a touch pen. The touch panel 11 displays the data read on the basis of the user's instruction or the like.

The detection unit 12 is a means for detecting a start point and an end point of a physical touch to the touch panel 11. The method of detecting a touch position is not limited, but known techniques such as a resistive coating technique, a surface acoustic wave technique, and an electrostatic capacitance technique can be considered. The detection unit 12 generates touch position data indicating the touch position and sequentially outputs the generated touch position data to the display control unit 13, while the user's finger or the touch pen touches the touch panel 11. The touch position data is data indicating a pressed point or section.

The display control unit 13 is a means for calculating the moving direction of a touch on the basis of the detection result from the detection unit 12 and enlarging or reducing a screen displayed on the touch panel 11 on the basis of the calculated moving direction.

When the first touch position data is input from the detection unit 12, the display control unit 13 stores the position where the finger or the touch pen first touches the touch panel 11 as a start point based on the input data. Thereafter, the display control unit 13 monitors an additional input of the touch position data and stores the position where the finger or the touch pen is separated from the touch panel 11 as an end point when the final touch position data is input.

Subsequently, the display control unit 13 calculates a vector extending from the start point to the end point as the moving direction of the finger or the touch pen on the touch panel 11. Then, the display control unit 13 determines whether the screen displayed on the touch panel 11 should be enlarged or reduced on the basis of the moving direction.

Figure 3:
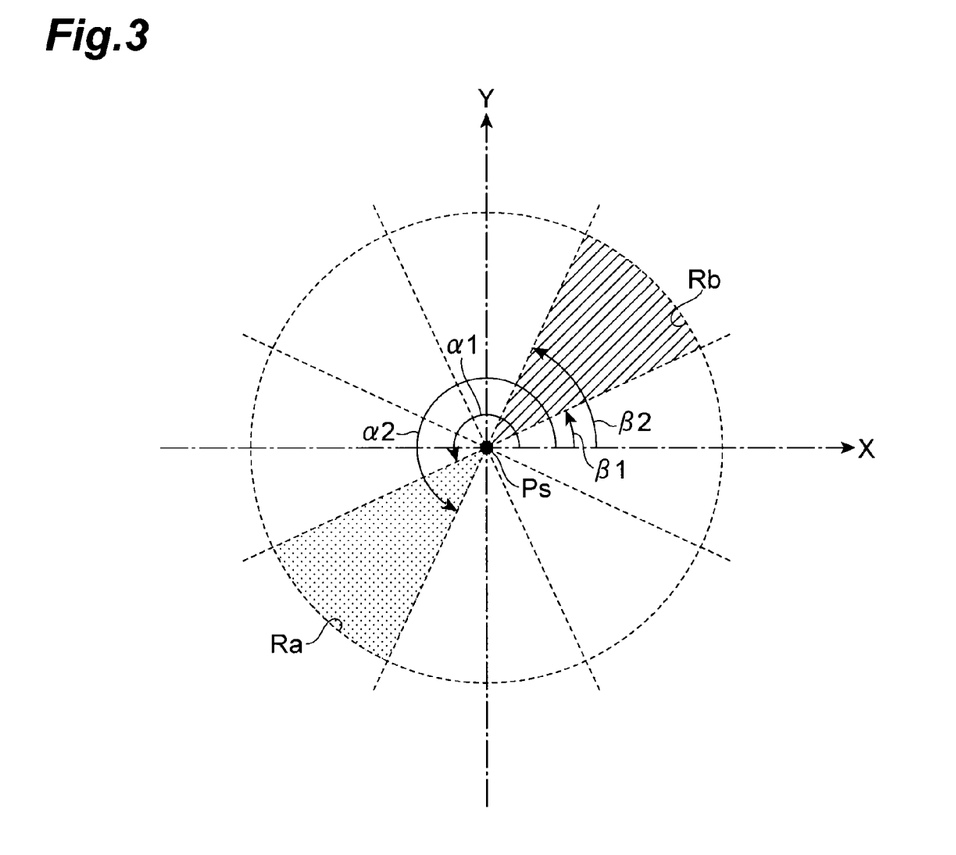
FIG. 3 is a diagram illustrating an example of a determination map used to determine whether a screen enlarging and reducing process should be performed.

Accordingly, the display control unit 13 stores range data indicating a range of a moving direction to be used in a screen enlarging or reducing process in advance therein. A determination map indicated by the range data is shown in FIG. 3. The determination map shown in FIG. 3 represents that the surrounding area of a start point Ps in a two-dimensional coordinate system where the start point Ps is set as an origin is divided into eight sections, a screen is enlarged when the moving direction from the start point Ps is within a section Ra inclined from the X axis by an angle of α1 to α2, and the screen is reduced when the moving direction from the start position Ps is within a section Rb inclined from the X axis by an angle of β1 to β2. In the example shown in FIG. 3, the sections Ra and Rb are opposed to each other. In the following description, the range of the section Ra is referred to as an "enlargement operation range" and the range of the section Rb is referred to as a "reduction operation range".

The setting of the enlargement operation range or the reduction operation range is not limited to the example shown in FIG. 3. For example, the section Ra in FIG. 3 may be set as the reduction operation range and the section Rb may be set as the enlargement operation range. The central angle between two ranges may be set to a different value and the two ranges need not be completely or absolutely opposed to each other. When the surrounding area of the start point Ps is divided into three or more sections, two arbitrary sections may be set as the enlargement operation range and the reduction operation range. In the example shown in FIG. 3, it can be considered that the operation ranges are defined using the angles α1, α2, β1, and β2, but the method of defining the operation ranges is not particularly limited.

Figure 4:
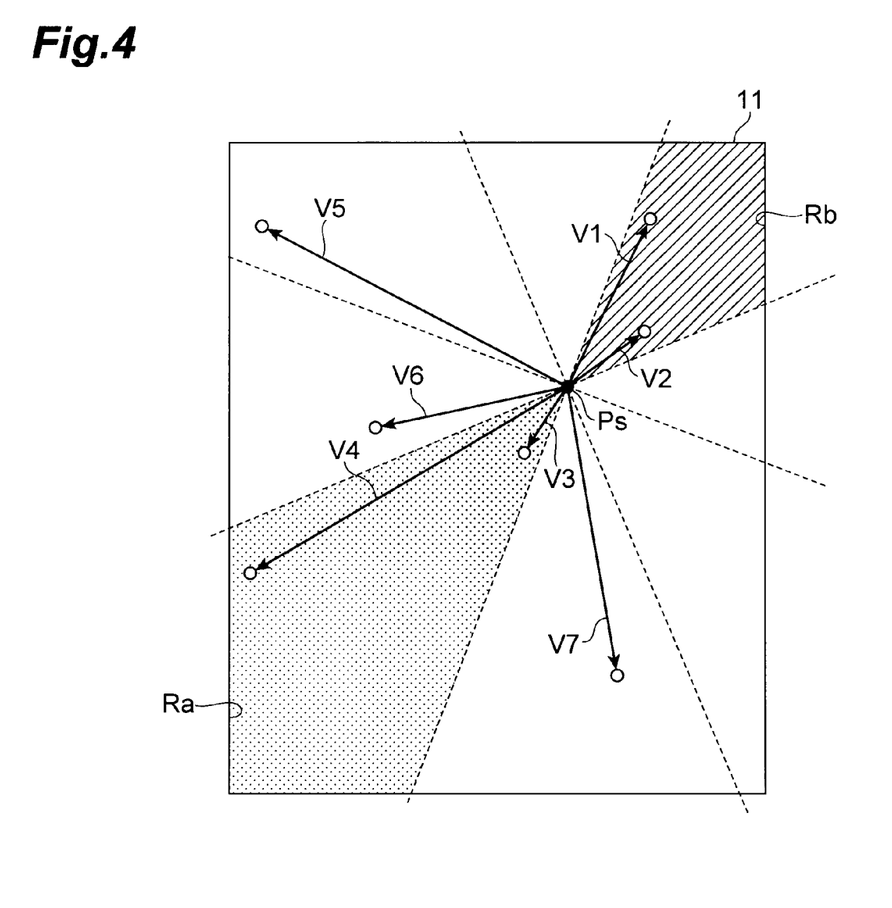
FIG. 4 is a diagram illustrating an example where the determination map is applied to a touch panel shown in FIG. 1.

The display control unit 13 determines whether the screen on display should be enlarged or reduced or whether the screen should be simply scrolled without enlargement and reduction of the screen, by applying the obtained moving direction to the range data (determination map) shown in FIG. 3. An example of the determination process is shown in FIG. 4. In FIG. 4, a black circle Ps represents a start point, white circles represent examples of an end point, and vectors V1 to V7 represent moving directions determined by the start point and the end points. The determination map shown in FIG. 4 is the same as shown in FIG. 3. In the example shown in FIG. 4, the display control unit 13 determines that the screen should be reduced when the moving direction is V1 or V2, determines that the screen should be enlarged when the moving direction is V3 or V4, and determines that the screen should be simply scrolled in the moving direction when the moving direction is otherwise (for example, V5 to V7).

Subsequently, the display control unit 13 enlarges, reduces, or scrolls the screen displayed on the touch panel 11 on the basis of the determination result. When the screen is enlarged or reduced, the display control unit 13 does not perform the scrolling process. The enlargement ratio or the reduction ratio may not be particularly limited.

Figure 5:
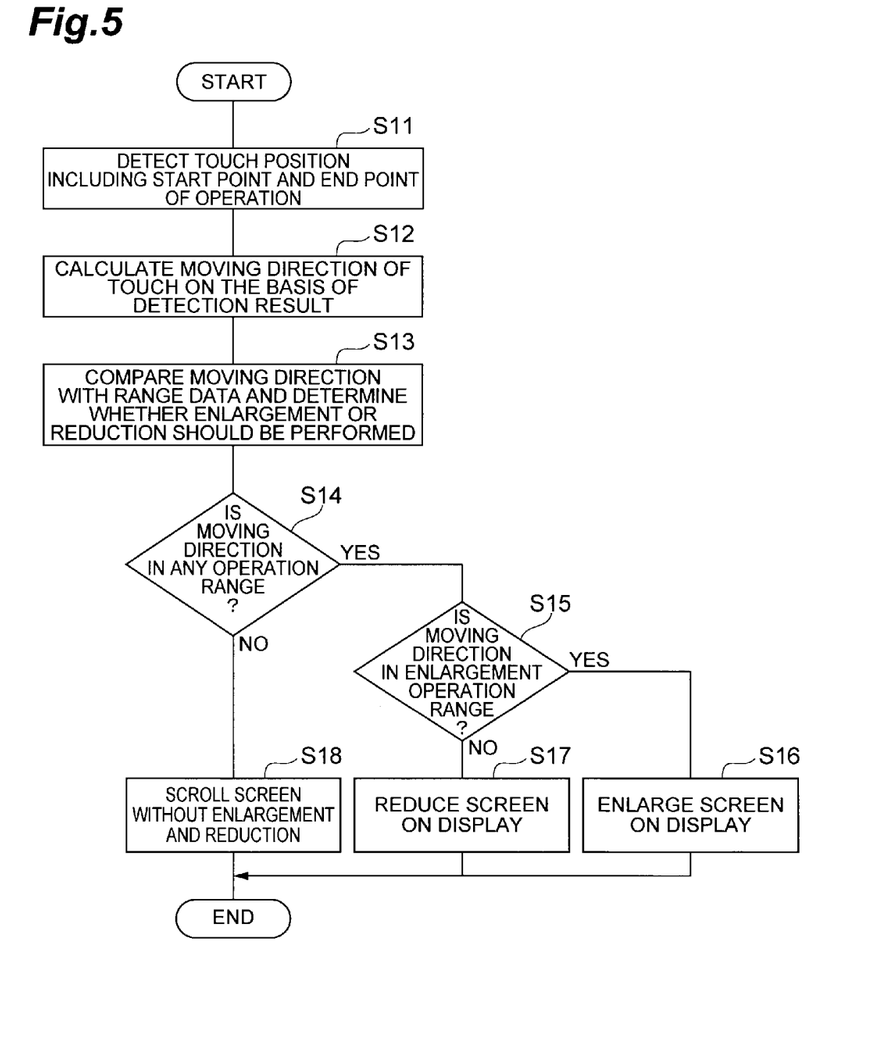
FIG. 5 is a flow diagram illustrating the flow of processes in the mobile phone shown in FIG. 1.

The operation of the mobile phone 1 shown in FIG. 1 and the screen display method according to this embodiment will be described with reference to FIG. 5. The following description is based on the premise that a screen is already displayed on the touch panel 11.

When a user drags the touch panel 11 with a finger or a touch pen, the detection unit 12 detects the touch position of the finger or the touch pen (step S11: detection step). The detected touch position includes a start point and an end point of the touch.

The display control unit 13 calculates the moving direction of the touch on the basis of the detection result (step S12) and determines whether the screen should be enlarged or reduced by comparing the moving direction with range data (step S13). At this time, the display control unit 13 enlarges the screen on display (step S16) when it is determined that the moving direction is within the enlargement operation range (YES in steps S14 and S15), and reduces the screen (step S17) when it is determined that the moving direction is within the reduction operation range (YES in step S14 and NO in step S15). On the other hand, when the moving direction is not within either of the two operation ranges (NO in step S14), the display control unit 13 simply scrolls the screen without enlargement and reduction of the screen (step S18). Accordingly, the processes of steps S12 to S18 can be said to be the display control step.

As described above, according to this embodiment, the moving direction of the touch on the touch panel 11 is calculated and a screen is enlarged or reduced and displayed depending on whether the moving direction is in a predetermined range. Accordingly, a user can enlarge or reduce a screen by touching a point on the touch panel 11 with a finger or a pointing device and moving the finger or the pointing device in a predetermined direction. That is, a user can enlarge or reduce a screen with a simple operation.

Figure 6:
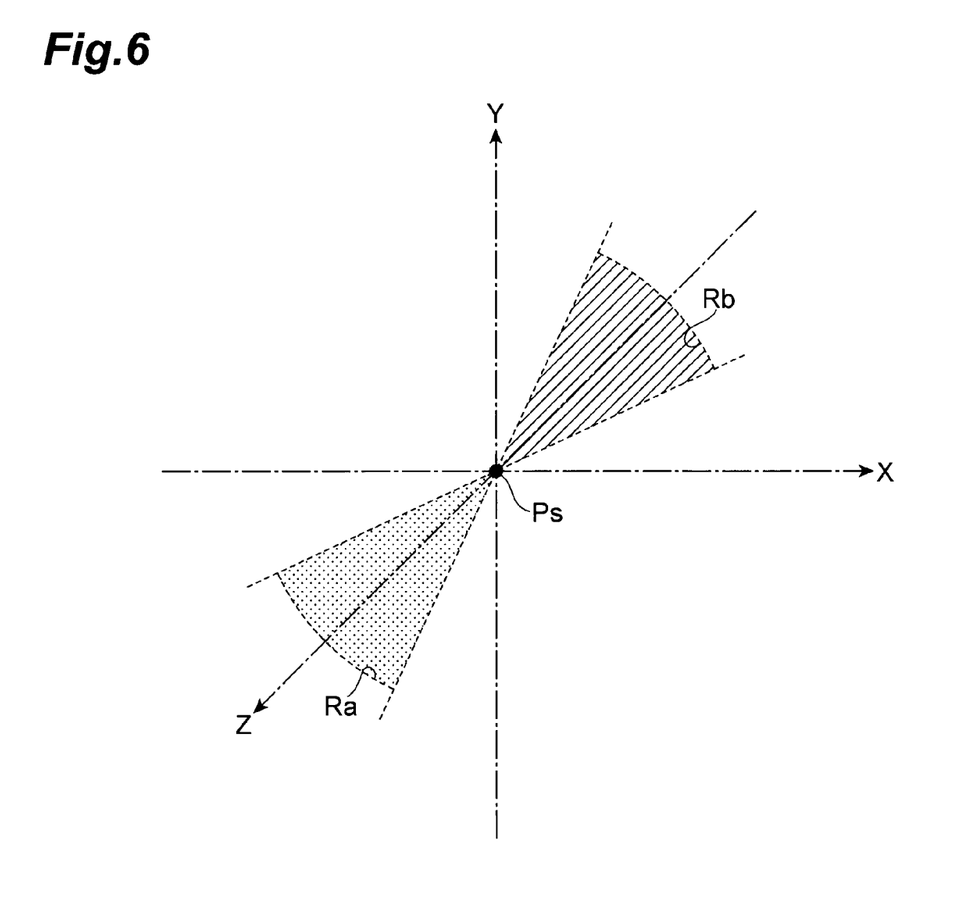
FIG. 6 is a diagram illustrating the reason of setting the determination map shown in FIG. 3.

Specifically, the screen is enlarged or reduced only when the touch operation and the moving operation are performed within the ranges (the sections Ra and Rb in FIGS. 3 and 4) in the mutually opposed oblique direction with respect to the start point of the touch. As shown in FIG. 6, this is intended to allow a user to intuitively perform the enlargement and reduction operation, by determining the Z axis (axis perpendicular to the touch panel) in a three-dimensional coordinate system obliquely projected onto a two-dimensional screen as the enlargement and reduction direction. In FIG. 6, the Z axis is added to the coordinates shown in FIG. 3 and the setting of the sections Ra and Rb is the same as shown in FIG. 3. For example, when the sections Ra and Rb are defined as the enlargement operation range and the reduction operation range, an image where a screen moves closer along the Z axis can be made to correspond to the enlargement process and an image where a screen moves away along the Z axis can be made to correspond to the reduction process. By setting the ranges (sections) in this way, it is possible to provide a display device which is convenient to use and which can allow a user to intuitively enlarge and reduce a screen.

According to this embodiment, it is possible to provide a user with an interface that enlarges or reduces a screen when the user drags the touch panel 11 in a specific direction (the direction of the section Ra or the section Rb) and that scrolls the screen when the user drags the touch panel in the other directions.

In the first embodiment, the display control unit 13 performs the scrolling process when the moving direction is out of the enlargement operation range and the reduction operation range, but this scrolling process need not be performed.

Second Embodiment

Figure 7:
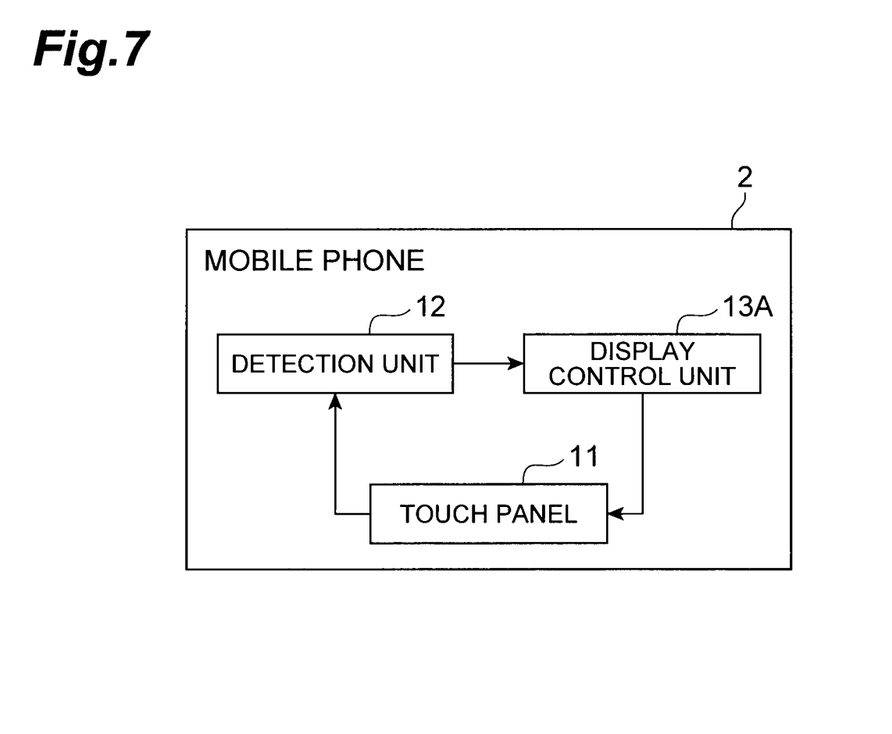
FIG. 7 is a block diagram illustrating the functional configuration of a mobile phone according to a second embodiment of the invention.

The functions and the configuration of a mobile phone 2 according to a second embodiment of the invention will be described with reference to FIGS. 7 and 8. The mobile phone 2 includes a display control unit 13A instead of the display control unit 13 in the first embodiment. The other configurations in this embodiment are the same as the first embodiment and thus will not be described. The hardware configuration of the mobile phone 2 or the method of embodying the functional elements by the use of the hardware configuration are the same as the first embodiment and thus will not be described.

The display control unit 13A is means for calculating the moving direction and the moving speed of a touch on the basis of the detection result from the detection unit 12 and enlarging or reducing a screen displayed on the touch panel 11 on the basis of the moving direction and the moving speed.

When first touch position data is input from the detection unit 12, the display control unit 13A stores the position where the finger or the touch pen first touches the touch panel 11 as a start point on the input data. The display control unit 13A starts measuring time so as to calculate the moving speed. Thereafter, the display control unit 13A monitors an additional input of the touch position data and stores the position where the finger or the touch pen is separated from the touch panel 11 as an end point when the final touch position data is input. The display control unit 13A acquires the time until the final touch position data is input after the first touch position data is input as a moving time.

Subsequently, the display control unit 13A calculates a vector extending from the start point to the end point as the moving direction of the finger or the touch pen on the touch panel 11. The display control unit 13A calculates the moving speed of the finger or the touch pen on the touch panel 11 by dividing the length of the vector by the moving time.

Then, the display control unit 13A determines whether the screen displayed on the touch panel 11 should be enlarged or reduced on the basis of the moving direction and the moving speed.

Accordingly, the display control unit 13A stores range data indicating a range of a moving direction to be used in a screen enlarging or reducing process in advance therein. A determination map indicated by the range data is shown in FIG. 8. The determination map shown in FIG. 8 includes sections Rc and Rd obtained by dividing the surrounding area of a start point Ps into two sections using a straight line defined by a function of $y=-x$ as a boundary in a two-dimensional coordinate system having the start point Ps as an origin. The section Rc is defined as the enlargement operation range and the section Rd is defined as the reduction operation range.

Figure 8:
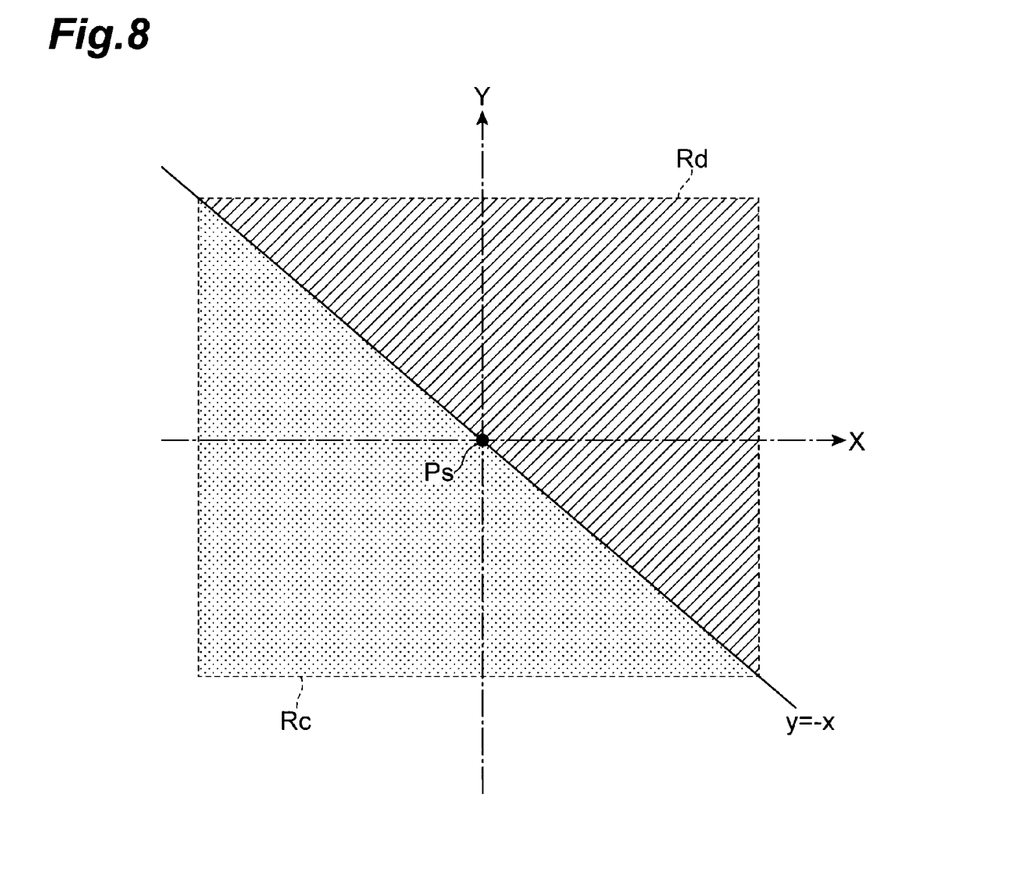
FIG. 8 is a diagram illustrating an example of a determination map used to determine whether a screen enlarging and reducing process should be performed.

The setting of the enlargement operation range or the reduction operation range is not limited to the example shown in FIG. 8. For example, the section Rc in FIG. 8 may be set as the reduction operation range and the section Rd may be set as the enlargement operation range. The first quadrant in the coordinates shown in FIG. 8 may be defined as the reduction (enlargement) operation range and the third quadrant may be defined as the enlargement (reduction) operation range. Alternatively, two ranges may be set as shown in FIG. 3. The sizes of the two ranges may be set to be different from each other and the two ranges need not be opposed to each other completely.

In addition to the range data, the display control unit 13A stores a threshold value T for the moving speed in advance therein. The threshold value T is a reference value used to determine whether a user of the mobile phone 2 performs a drag operation or a flick operation on the touch panel 11. Here, the drag operation means an operation of dragging the touch panel 11 and the flick operation means an operation of flicking the touch panel 11. In this embodiment, the flick operation is based on the premise that the user moves his or her finger or the touch pen more rapidly than in the drag operation.

The display control unit 13A determines whether the screen on display should be enlarged or reduced or whether the screen should be simply scrolled without enlargement and reduction, by applying the calculated moving direction to the range data (determination map) shown in FIG. 8 and comparing the calculated moving speed with the threshold value. On the premise of the determination map shown in FIG. 8, the display control unit 13A determines that the screen should be enlarged when the moving direction is within the range of the section Rc and the moving speed is equal to or greater than the threshold value T, and determines that the screen should be reduced when the moving direction is within the range of the section Rd and the moving speed is equal to or greater than the threshold value T. On the contrary, when the moving speed is less than the threshold value T, the display control unit 13A determines that the screen should be simply scrolled in the moving direction. That is, the display control unit 13A enlarges or reduces the screen in the direction when the flick operation is performed, and scrolls the screen in the direction when the drag operation is performed.

Subsequently, the display control unit 13A enlarges, reduces, or scrolls the screen displayed on the touch panel 11 on the basis of the determination result. When the screen is enlarged or reduced, the display control unit 13A does not perform the scrolling process. The enlargement ratio or the reduction ratio may not be particularly limited.

Figure 9:
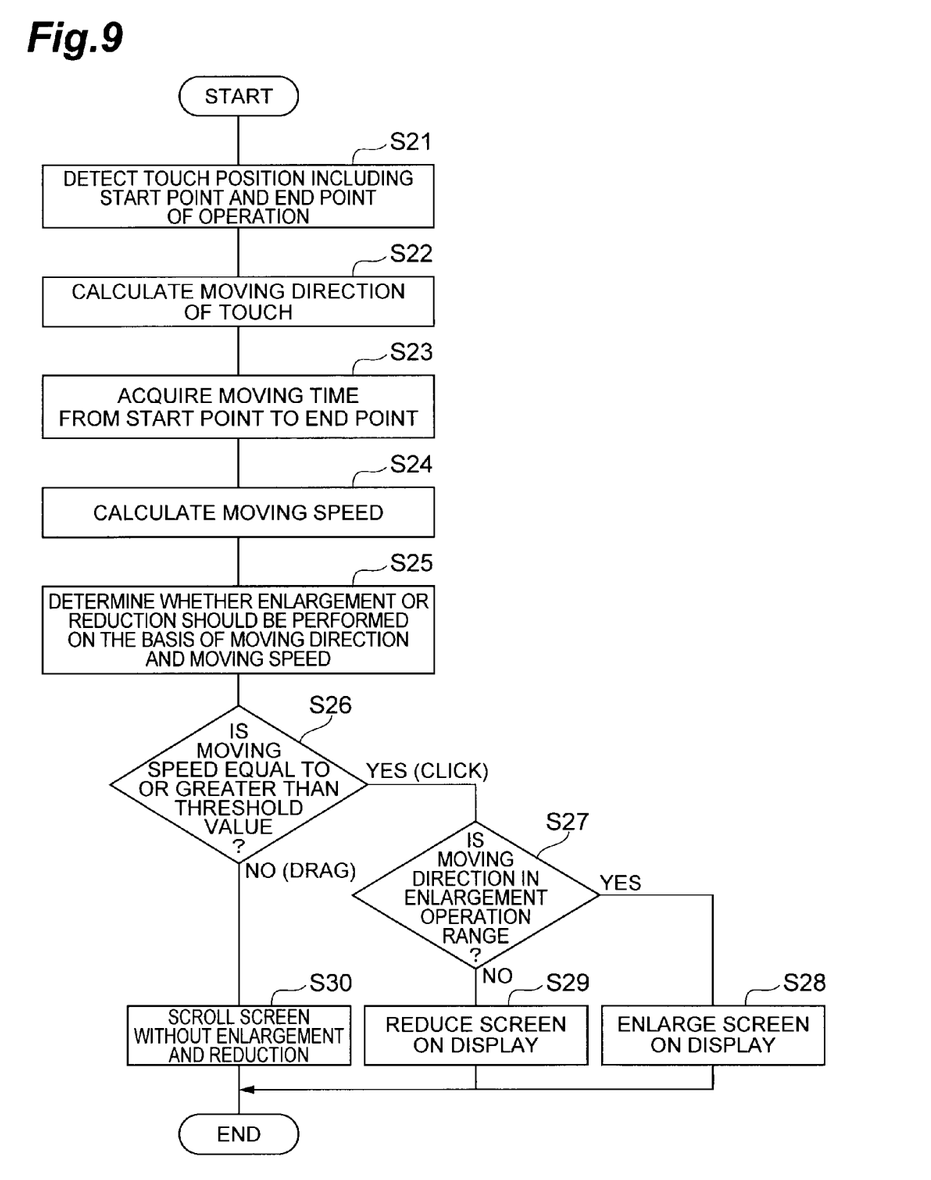
FIG. 9 is a flow diagram illustrating the flow of processes in the mobile phone shown in FIG. 7.

The operation of the mobile phone 2 shown in FIG. 7 and the screen display method according to this embodiment will be described with reference to FIG. 9. The following description is based on the premise that a screen is already displayed on the touch panel 11.

When a user performs a drag operation or a flick operation with a finger or a touch pen, the detection unit 12 detects the touch position of the finger or the touch pen (step S21: detection step). The detected touch position includes the start point and the end point of the touch.

The display control unit 13A calculates the moving direction of the touch on the basis of the detection result (step S22). The display control unit 13A acquires the moving time from the start point to the end point (step S23) and then calculates the moving speed of the touch (step S24). Subsequently, the display control unit 13A determines whether the screen should be enlarged or reduced on the basis of the moving direction and the moving speed (step S25).

The display control unit 13A enlarges the screen on display (step S28) when it is determined that the moving speed is equal to or greater than the threshold value T and the moving direction is within the enlargement operation range (YES in steps S26 and S27). The display control unit 13A reduces the screen on display (step S29) when it is determined that the moving speed is equal to or greater than the threshold value T and the moving direction is within the reduction operation range (YES in step S26 and NO in step S27). On the other hand, when the moving speed is less than the threshold value T (NO in step S26), the display control unit 13A simply scrolls the screen without enlargement and reduction of the screen (step S30). Accordingly, the processes of steps S22 to S30 can be said to be the display control step.

As described above, according to this embodiment, when the operation of dragging the touch panel 11 is performed within the section Rc or Rd at a speed equal to or greater than the threshold value T, a screen is first enlarged or reduced. Accordingly, a user can enlarge or reduce a screen with a simple operation.

According to this embodiment, it is possible to provide a user with an interface that enlarges or reduces a screen when the user drags the touch panel 11 in a specific direction (the direction of the section Rc or Rd) at a speed equal to or greater than the threshold value T and that scrolls the screen in the direction regardless of whether the direction in which the screen is dragged is within the sections Rc and Rd when the user drags the touch panel at a speed less than the threshold value.

In the second embodiment, when the moving speed is less than the threshold value T, the display control unit 13A performs the scrolling process, but this scrolling process need not be performed.

Hitherto, the invention has been described in detail with reference to the embodiments. However, the invention is not limited to the embodiments. The invention may be modified in various forms without departing from the concept of the invention.

Although the invention has been applied to a mobile phone in the above-mentioned embodiments, the invention may be applied to a personal digital assistant (PDA), a mobile or stationary personal computer, or other information processing devices. The invention does not depend upon the existence of a communication function.

1, 2 mobile phone (display device)
11 touch panel
12 detection unit (detection means)
13, 13A display control unit (display control means)

What is claimed is:

1. A display device comprising:
   a touch panel that displays a screen and receives a predetermined input;
   a detection unit that detects a start point and an end point of a physical touch on the touch panel; and
   a display control unit that calculates a moving direction of the touch on the basis of the detection result from the detection unit, wherein
   the display control unit calculates a vector extending from the start point to the end point as the moving direction, enlarges the screen displayed on the touch panel when the moving direction is in a predetermined first range, and reduces the screen when the moving direction is in a predetermined second range different from the first range,
   the first and second ranges are obtained by dividing a surrounding area of the start point, and
   the display control unit calculates the moving speed of the touch on the basis of the detection result from the detection unit, enlarges the screen displayed on the touch panel when the moving speed is equal to or greater than a predetermined threshold value and the moving direction is in the first range, and reduces the screen when the moving speed is equal to or greater than the predetermined threshold value and the moving direction is in the second range.

2. The display device according to claim 1, wherein the first range is a section obtained by dividing the surrounding area of the start point into three or more sections and the second range is another section different from the section obtained.

3. The display device according to claim 2, wherein
the first range is a section obtained by dividing the surrounding area of the start point into eight sections and the second range is another section different from the section obtained,
each of the section and the other section extends in an oblique direction from the start point in the screen, and
at least a part of the other section is opposed to the section obtained.

4. The display device according to claim 2, wherein the display control unit scrolls the screen in the moving direction when the moving direction is out of the first and second ranges.

5. The display device according to claim 1, wherein the display control unit scrolls the screen in the moving direction when the moving speed is less than the predetermined threshold value.

6. The display device according to claim 1, wherein
the first range is obtained by dividing the surrounding area of the start point within a first section inclined from the X axis by a first predetermined angular range.

7. The display device according to claim 6, wherein
the second range is obtained by dividing the surrounding area of the start point within a second section inclined from the X axis by a second predetermined angular range that is different from the first predetermined angular range.

8. The display device according to claim 7, wherein
a first center of the first predetermined angular range is 180 degrees different from a second center of the second predetermined angular range.

9. A screen display method executed by a display device including a touch panel that displays a screen and receives a predetermined input, the screen display method comprising:
a detection step of detecting a start point and an end point of a physical touch on the touch panel; and
a display control step of calculating a moving direction of the touch on the basis of the detection result in the detection step, wherein
the display control step includes:
calculating a vector extending from the start point to the end point as the moving direction;
calculating the moving speed of the touch;
enlarging the screen displayed on the touch panel when the moving speed is equal to or greater than a predetermined threshold value and when the moving direction is in a predetermined first range; and
reducing the screen when the moving speed is equal to or greater than the predetermined threshold value and when the moving direction is in a predetermined second range different from the first range, wherein
the first and second ranges are obtained by dividing a surrounding area of the start point.

* * * * *